S. H. HOBSON

July 26, 1932. WATER SYSTEM PUMP UNIT Re. 18,543

Original Filed Dec. 24, 1928

Inventor:
Stanley H. Hobson
By Wilson & McCanna
Attys.

Reissued July 26, 1932

Re. 18,543

UNITED STATES PATENT OFFICE

STANLEY H. HOBSON, OF ROCKFORD, ILLINOIS, ASSIGNOR TO GEO. D. ROPER CORPORATION, OF ROCKFORD, ILLINOIS, A CORPORATION OF ILLINOIS

WATER SYSTEM PUMP UNIT

Original No. 1,764,307, dated June 17, 1930, Serial No. 328,262, filed December 24, 1928. Application for reissue filed March 28, 1932. Serial No. 601,662.

This invention relates to a pump unit for various purposes, but in this instance especially designed for domestic water system installations, and still more particularly those having shallow driven wells, or dug wells, cisterns, etc.

Water systems as heretofore installed had a greatly diversified arrangement of the pump, storage tank, check valves, etc., and correspondingly different spaced relationships of said elements, and it was accordingly extremely difficult, if not impossible, for the manufacturer's engineering department or dealer to diagnose and remedy troubles arising in service; every installation had its own peculiarities. Furthermore, certain arrangements gave rise to complaints from the customer on account of the excessive water hammer action for which the pump or other accessories could not be held responsible, not to mention such other difficulties as air trapping or the failure of the pump to keep primed, all of which meant a great deal of vexation and expense to the manufacturer or dealer. It is, therefore, the principal object of my invention to provide a self-contained pump unit comprising the following parts, assembled together in a predetermined desired relationship: a pump, an electric motor for driving the same, a storage tank, an automatic pressure regulator, and such other accessories as a safety relief valve, pressure gauge, and combination strainer and check valve. Thus, when the unit arrives on the job all that is necessary for the installation thereof is to connect the supply and service pipes therewith. This standardizes water systems and eliminates all of the otherwise mysterious service troubles and enables the manufacturer or dealer to give intelligent advice to remedy any trouble that might arise without being put to a needless and endless amount of trouble and expense.

According to my invention the storage tank is disposed vertically and directly above the pump and has a union connecting the bottom thereof with the top of the pump so that the tank is not only in close coupled relation with the pump for compactness of the unit but is thereby also supported on the pump, no other means of support being found to be necessary. In order, however, to provide better support for the tank, I have provided a sheet metal jacket fitting about the lower end of the tank reaching from the tank down to the base and having an annular bead thereon arranged to engage beneath the tank so that when the jacket is fastened in place, as by means of bolts clamping the free ends thereof together, the jacket serves as a support for the tank and holds it absolutely rigid with the base. The space inside the jacket alongside the pump provides a handy place for the automatic pressure regulator suspended from the bottom of the tank in open communication therewith so as to control the operation of the pump according to the pressure in the tank, there being electrical connection between the regulator and the motor for that purpose. The motor is suitably mounted on the same base with the pump outside the jacket.

The invention is illustrated in the accompanying drawing, wherein—

The same reference numerals are applied to coresponding parts throughout the views.

Figure 2:
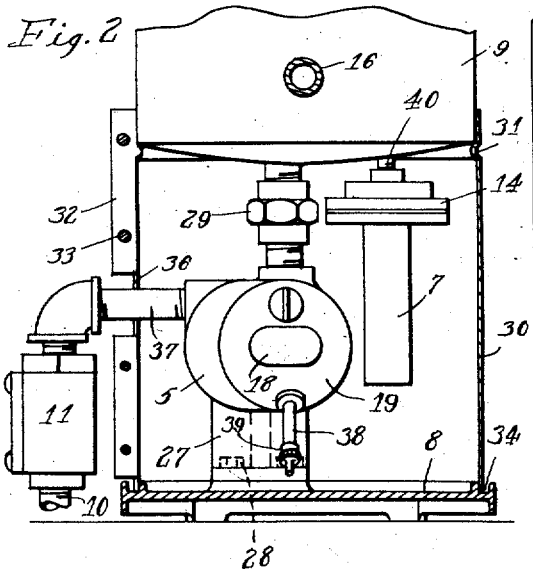
Fig. 2 is a vertical section through the lower part of the unit taken on the line 2—2 of Figure 1 looking in the direction of the arrows.

The present apparatus, as may be gathered from the foregoing, is complete in itself, being arranged to be electrically driven and automatically controlled, and arranged to start and stop of itself. It is primarily designed and intended for domestic use to furnish water under pressure to all faucets to correspond to city water service, running water being supplied to the kitchen sink, bathroom, and laundry, as well as to places outside the house as, for example, stock tanks, etc., in farm installations. The particular pump utilized in this apparatus adapts the same to use for shallow driven well installations where the depth does not exceed say, twenty feet, or dug wells, cisterns, etc. The apparatus, briefly stated, comprises a pump 5, electric motor 6 for driving the same, and an automatic pressure regulator 7, all mounted on a base 8 together with a storage tank 9. Water from the well or cistern is drawn by the pump through a supply pipe 10 and combination strainer and check valve 11 and stored in the tank 9 under a pressure of from, say, twenty pounds to thirty-five pounds per square inch, the pressure being indicated by a gauge 12 mounted preferably directly on a safety relief valve 13. The pressure regulator 7 is of a standard well known type having a diaphragm in the casing 14 thereon arranged to complete the circuit for the motor 6 when the pressure in the tank, by reason of water having been drawn therefrom, has dropped to, say twenty pounds per square inch, and also arranged to break the circuit when, by reason of operation of the pump and replacement of the water supply in the storage tank, the pressure therein has been raised to, say, thirty-five pounds per square inch, it being understood that a head space for trapped air is left in the tank to permit pressure to be built up therein in the manner described. The relief valve 13 has a waste pipe 15 leading to any suitable waste receptacle to allow water to be exhausted from the tank if, for any reason, the pressure therein builds up beyond a certain predetermined point for which the valve 13 is set, that happening, for example, in case the pressure regulator 7 fails, for any reason, to function properly. The valve 12 will, of course, be set to open at a pressure appreciably higher than that at which the regulator 7 is arranged to break the circuit for the motor. The reason for this is thought to be self-evident. Water is supplied to a pipe leading to the service system from the storage tank 9 through a pipe 16, valve 13 and rubber hose connection 17. This much description will suffice to give a general understanding of the unit of my invention and to make it evident that the same is entirely self-contained, it being a very simple matter to install the same in a domestic water system inasmuch as it is only necessary to connect therewith the supply pipe 10 and the service pipe. The flexible rubber hose connection 17, it should also be evident, prevents vibration and humming incident to the operation of the pump and motor from being transmitted to the service pipe and thence to the piping system. It is also of considerable advantage to use a hose connection since it might otherwise be hard to make a threaded connection, as, for example, by means of a union, due to slight misalignment of the service pipe. I shall now proceed to a description of the various novel features of construction and arrangement incorporated in the apparatus and call particular attention to the advantages in the matters of simplicity in operation, low initial cost, low operating cost, and freedom from breakdowns and the incident expenses and annoyances.

The pump 5 forms the subject matter of another application, Serial No. 300,666, filed August 20, 1928, and it will, therefore, suffice for the present purposes merely to state that it is of the rotary gear type having preferably a pair of spiral cut bronze gears pressed onto hardened and ground steel shafts received in the bearings 18 on the face plate 19, the driven shaft 20 of the pair being extended through a bearing 21 on the other face plate 22. The two face plates 19 and 22 are bolted rigidly to a cast iron housing 23 in which the spiral pumping gears are disposed. The shaft 20 has a flexible coupling 24 for connection with the armature shaft 25 of the motor 6. The latter is bolted onto the base 8, as indicated at 26. The pump 5 has a supporting bracket 27 formed preferably integral with the face plate 22 and bolted to the base 8, as at 28. It is believed to be evident that the coupling 24, aside from providing a direct connection between the pump 5 and motor 6, thereby avoiding use of a belt and the troubles going with that kind of operation, takes care of any slight misalignment of the pump with respect to the motor and makes for smooth and quiet operation.

Figure 1:
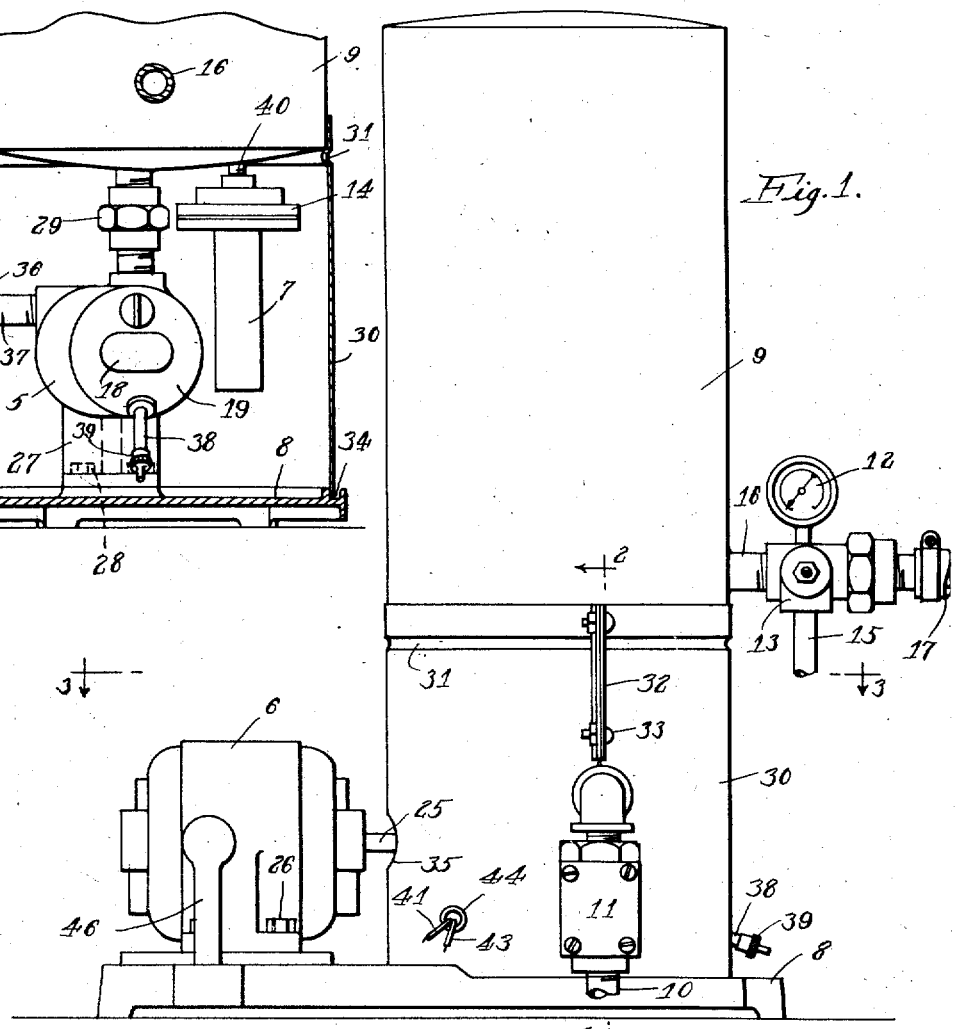
Figure 1 is a side view of a pump unit made in accordance with my invention.

The storage tank 9, it will now be observed is connected to the pump in close coupled relation therewith by means of a union 29. The union serves not only to connect the tank with the discharge side of the pump so that it is supplied with water therefrom in the operation of the pump, but actually constitutes a support for the tank, thereby dispensing with extra parts which would otherwise have to be provided for the purpose and which would mean additional cost not only for the material itself but extra labor cost in the assembling. The fact that the tank is disposed vertically relieves the union of any lateral strain, but in order that there will be no danger of the union being broken in the shipment of the pump unit by having something come in contact with the tank and also in order that the tank will at all times remain rigid with the pump on the base, I have provided additional supporting or bracing means in the form of a sheet metal jacket 30. The latter is substantially circular in form and fits about the lower end of the tank and extends down from the tank to the base, thus enclosing the pump beneath the tank and giving the unit the neat, trim appearance shown in Figure 1. The jacket has an annular bead 31 formed therein near the upper end thereof arranged to fit under the bottom of the tank and provide more or less of a seat for the tank on the jacket, especially when the flanged free ends 32 of the sheet metal forming the jacket are clamped together, as by means of bolts 33, to cause the jacket snugly to embrace the lower end of the tank. The lower end of the jacket is received in a circular groove 34 formed in the base. A hole 35 in the jacket has to be provided for the extension of the armature shaft therethrough for coupling with the pump and another hole 36 is provided in the jacket for extension therethrough of the pipe 37 connecting the combination stringer and check valve 11 with the suction side of the pump. A pipe 38 tapped into the pump casing in the suction side thereof directly below and between the pumping gears has a pneumatic valve mounted therein and a cap 39 normally closing the outer end thereof, the cap being accessible from the outside of the jacket by reason of the extension of the pipe 38 through a slot in the lower end of the jacket. When more air is needed in the storage tank it is only necessary to remove the cap 39 to allow air to be drawn in with the water and forced into the tank. As soon as the proper amount of air has been taken in the cap is replaced and the otherwise fully automatic operation of the unit, as previously described, is resumed.

The mounting of the tank on the pump in close coupled relation therewith, aside from making for compactness of the unit as a whole, has the advantage of enabling elimination of the check valve ordinarily provided in the discharge line between the pump and the storage tank, and the combination strainer and check valve 11 takes the place of a strainer and foot valve otherwise provided. Considering for a moment just the combination strainer and check valve 11, pump 5, and storage tank 9, it will be evident that the tank 9 being disposed directly above the pump serves as an air chamber for the pump to take the shock in the discharge line going with the operation of the pump; the water hammer action so common to many systems, especially where the tank is located at an appreciable distance away from the pump, is avoided. A saving is realized furthermore, by using the pressure tank as an air chamber inasmuch as it was formerly necessary to provide a separate air chamber for the pump. The location of the tank directly above the pump produces still other savings by reason of the elimination of piping, elbows, etc., not to mention the fact that the check valve on the discharge line otherwise necessitated is dispensed with. The location of the tank directly above the pump also positively prevents air trapping since any air accumulating in the pump casing around the pumping gears has easy escape into the storage tank and, of course, tends naturally to rise from the pump into the tank. In water systems provided in the past, where a foot valve was used on the suction side of the pump located at a considerable depth below the pump, there was always more or less likelihood of the pump going dry. For example, a very slight leak in the suction line would frequently result in a drainage of the water from above the foot valve and the pump would not remain primed. In the present apparatus, the use of the combination strainer and check valve 11 right next to the pump and connected with a high point of its casing avoids any possibility of the pump going dry. Briefly stated, then, my novel arrangement of the storage tank directly above the pump and using a check valve on the suction side of the pump has the advantages of eliminating a check valve and separate air chamber in the discharge line, keeps the pump primed, prevents air trapping, and also eliminates water hammer action.

Figure 3:
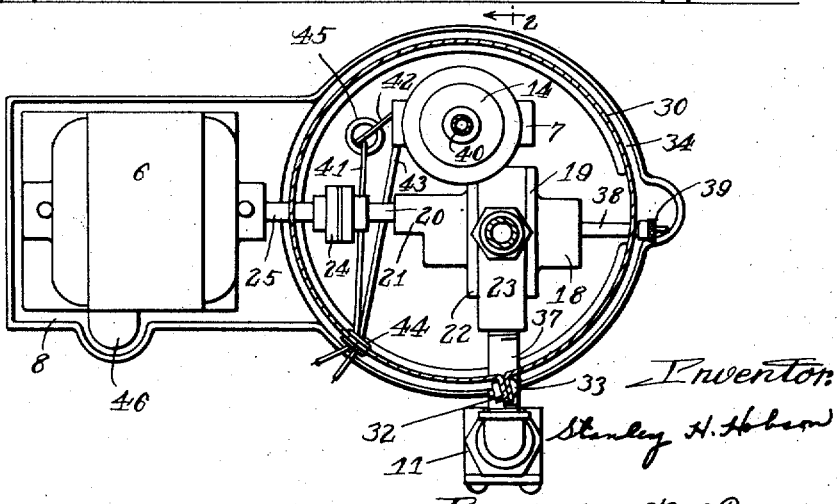
Fig. 3 is a horizontal section taken on the line 3—3 of Figure 1.

The jacket 30 affords sufficient space therein alongside the pump for the automatic pressure regulator 7 with its diaphragm casing 15, as should be evident from Figs. 2 and 3. The casing 14 has a pipe connection 40 with the bottom of the tank, the automatic pressure regulator being thereby suspended from the tank with the diaphgram therein maintained subject to the pressure existing in the tank so that the regulator is arranged to make and break the circuit for the motor 6, as previously referred to. Wires 41, 42 and 43 are shown connecting the motor 6 and regulator 7 together in the line, the wires 41 and 43 being extended through the insulator bushing 44 mounted in the wall of the jacket 30 for connection with the line and wires 41 and 42 being shown extended through a conduit 45 beneath the base 8 over to a conduit 46 leading up to the motor.

It is believed the foregoing description conveys a clear understanding of my invention and of its various objects and advantages. The appended claims have been drawn with a view to affording a degree of protection commensurate with these improvements.

I claim:

1. In a pumping apparatus of the character described, the combination in a self-contained unit, of a supporting base, a pump mounted thereon, a storage tank disposed vertically directly above and connected at its bottom with the pump in close coupled relation therewith, the said connection serving to support the tank approximately centrally on the pump, a jacket enclosing the pump and extending from the base up to the tank so as to serve as an auxiliary support for the tank by engagement therewith circumferentially of the lower end thereof, and a motor mounted on the base and having a driving connection with the pump.

2. A unit as set forth in claim 1 including an automatic pressure regulator attached to the tank and disposed alongside the pump within the jacket, said regulator having an electrical connection with the motor for the purpose described.

3. A unit as set forth in claim 1 including an automatic pressure regulator connected to and suspended from the bottom of the tank whereby the same is disposed inside the jacket and concealed thereby, said regulator having electrical connections with the motor for the purpose described.

4. In a pumping apparatus of the character described, the combination in a self-contained unit, of a supporting base, a pump mounted thereon, a storage tank approximately circular in horizontal section disposed vertically directly above and connected at the approximate center of its bottom with the pump in close coupled relation therewith, the said connection serving to support the tank approximately centrally on the pump, a circular jacket fitting about the lower end of the tank and extending down to the base, thereby serving as an auxiliary support for the tank and enclosing the pump, said jacket being arranged to be contracted at its upper end to clamp the lower end of the tank therein, there being an upstanding annular shoulder on the base of approximately the same diameter as the tank and said jacket being arranged to be contracted at its lower end to clamp onto said shoulder, and a motor mounted on the base having a driving connection with the pump.

5. In a pumping apparatus of the character described, the combination in a self-contained unit, of a supporting base, a pump mounted on said base at one end thereof, a motor mounted on said base at the other end and having a direct mechanical driving connection with the pump, a storage tank disposed with its longitudinal axis vertical directly above the pump, a union connecting the approximate center of the bottom of the tank with the top discharge of the pump, said union serving to support the tank entirely on the pump, an automatic pressure regulator connected to and suspended from the bottom of the tank alongside the pump, said regulator having an electrical connection with the motor for controlling the operation thereof according to the pressure existing in the tank, and a sheet metal jacket fitting about the lower end of the tank and reaching down to the base around the pump and regulator, the free ends of the sheet metal forming the jacket being flanged outwardly and arranged to be bolted together whereby to clamp the jacket onto the tank and hold the same rigid with the base.

6. In a pumping apparatus of the character described, the combination in a self-contained unit, of a supporting base, a pump mounted thereon, a storage tank disposed vertically directly above and connected at its bottom with the discharge side of the pump in close coupled relation therewith, the said connection serving to support the tank on the pump, an automatic pressure regulator communicating with the bottom of the tank and disposed directly therebeneath alongside the pump, a jacket enclosing the pump and regulator and extending from the base up to the tank and serving to hold the tank rigid with the base, a motor mounted on the base outside the jacket and having a driving connection with the pump through an opening provided in the jacket, and electrical wire connections for the regulator with the motor, extended from the regulator inside the jacket under the base to the motor.

7. In a pumping apparatus of the character described, the combination of a suitable support, a pump supported thereon, a storage tank disposed vertically directly above the pump and permanently connected centrally of its bottom with the pump in close coupled relation, the close coupled connection serving to support the tank on the pump, a hollow substantially cylindrical jacket of a height to reach from the support up to the tank, and of a diameter to enclose the pump and fit on the lower end of the tank, the tank having detachable engagement with the upper end of the jacket so that the latter serves as an auxiliary support for the tank but may be removed, and a motor on said support having a driving connection with the pump.

8. In a pumping apparatus of the character described, the combination in a self-contained unit, of a supporting base, a pump mounted thereon, a storage tank disposed vertically directly above and connected at its bottom with the pump in close coupled relation therewith, the said connection serving to support the tank on the pump, a jacket enclosing the pump and extending from the base up to the tank so as to serve as an auxiliary support for the tank by engagement therewith circumferentially of the lower end thereof, and a motor having a driving connection with the pump.

In witness of the foregoing I affix my signature.

STANLEY H. HOBSON.